United States Patent [19]

Coder

[11] 4,389,146
[45] Jun. 21, 1983

[54] AUTOMATICALLY-DRIVEN CHUCK ACCESSORY FOR HAND DRILL

[76] Inventor: James D. Coder, 701 W. Lincoln St., Belleville, Ill. 62223

[21] Appl. No.: 205,523

[22] Filed: Nov. 10, 1980

Related U.S. Application Data

[63] Continuation of Ser. No. 14,847, Feb. 26, 1979, abandoned.

[51] Int. Cl.³ .................. B23B 31/06; B23B 45/02
[52] U.S. Cl. .............................. 408/240; 81/90 A; 279/1 K; 279/62
[58] Field of Search ............... 408/124, 240; 279/1 K, 279/48, 49, 56, 57, 58, 59, 60, 61, 62, 63, 64, 65, 69; 81/90 A

[56] References Cited

U.S. PATENT DOCUMENTS

| | | | |
|---|---|---|---|
| 2,716,555 | 8/1955 | Rowe | 279/56 |
| 3,433,082 | 3/1969 | Bitter et al. | 408/124 X |
| 3,652,879 | 3/1972 | Plunkett et al. | 408/124 X |
| 3,872,951 | 3/1975 | Hastings, Jr. | 279/1 K X |

Primary Examiner—Z. R. Bilinsky
Attorney, Agent, or Firm—Kalish & Gilster

[57] ABSTRACT

An accessory is attached to a reversible electric drill-type tool, i.e., a portable electric drill, for facilitating engagement and disengagement of the shank of a drill or other tool element by the drill chuck. For this purpose, the chuck is provided with a recess in a sleeve thereof. The accessory has a locking device selectively movable between a first position disengaged from the recess and a second position engaging the recess. Such element is supported by a collar carried on a front face of a housing of the tool to permit selective movement of the element between the first and second positions. The collar maintains the locking element in fixed angular relationship with respect to the axis of rotation of the chuck. In the first position, the locking element prevents rotation of the chuck sleeve relative to the housing. In this way, operation of the tool turns in one direction or the other provides respective tightening or loosening of the chuck for engagement or disengagement of the shank. In the second position, unencumbered normal rotation of the chuck collar with the chuck is permitted.

2 Claims, 3 Drawing Figures

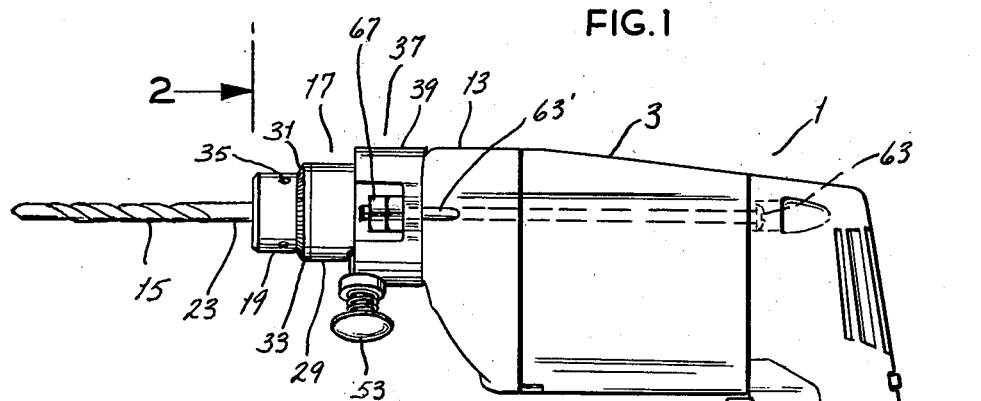

AUTOMATICALLY-DRIVEN CHUCK ACCESSORY FOR HAND DRILL

This is a continuation of application Ser. No. 14,847 filed Feb. 26, 1979 now abandoned.

BACKGROUND AND SUMMARY OF THE INVENTION

The present invention relates to power tools and, more particularly, to reversible drill-type tools, such as portable electric drills.

Typically, electric drills, particularly of the hand-held type, are equipped with a chuck which may be loosened or tightened by the user of a chuck key which, for this purpose, is inserted into an aperture of the chuck and is turned to loosen or tighten elements of the chuck which clampingly engage the periphery of a drill shank or other shanked work piece or tool, such as the spindle of a polishing or sanding disk.

Since chucks of this type are most frequently employed for holding a drill, they are often referred to as drill chucks even though many other usages are made.

It is often inconvenient and bothersome to find the chuck key and insert the same in the chuck for tightening or loosening purposes. Often, the key is lost or misplaced and time which otherwise could be usefully spent is instead wasted hunting for the key. For this reason, various hand drill manufacturers have provided arrangements for retaining the chuck key by clipping it to the body of the drill, to the power cord for the drill, or attaching the key by means of a flexible cord of cable so that it cannot be lost.

Nevertheless, even if kept with the drill, the chuck key must be inserted within the chuck and manually manipulated in an awkward, slow and bothersome fashion in order to tighten or loosen the chuck for respective engagement or disengagement of the shank of the drill or other tool to be held by the chuck.

In recent years, electric hand drills of the type for which the invention is intended are often available with reversing features for permitting the chuck to be turned in either direction by the drill motor and also permitting the speed of the chuck to be varied by controlling the degree of energization of the electric motor. The present invention is intended to take advantage of the fact that, with such drills, tightening or loosening of the chuck can be obtained by holding the barrel of the chuck stationary while other elements of the chuck are turned in one direction or the other by operation of the drill at reduced power.

Accordingly, it is an object of the present invention to provide an accessory for facilitating engagement and disengagement of the shank of a drill or the like by a drill chuck, hereinafter referred to as a chuck.

A further object of the invention is the provision of such an accuracy which is readily attached to hand drills of typical commercially available design without requiring expensive or typical modification thereof.

Yet another object of the invention is the provision of such an accessory which utilizes the existing rotational operation of the drill in selective opposite directions to tighten or loosen the chuck for thereby facilitating engagement and disengagement of the shank of a drill or the like by the chuck.

A still further object of the invention is the provision of such an accessory which is selectively operable to effectively lock the chuck barrel to prevent it from turning relative to the drill housing whereby, on operation of the drill, the chuck will be selectively tightened or loosened.

A still further object of the invention is the provision of such an accessory which conduces to extremely convenient selective locking of the chuck barrel in a facile physiologically natural manner by the user.

Another object of the invention is the provision of such an accessory which can function in a manner to prevent damage to the drill in the event that excessive torque should be applied to the chuck by the drill motor when the chuck barrel is locked by use of the accessory.

Among still other objects of the invention may be noted the provision of such an accessory which is not only of relatively low cost construction but is simply and easily assembled, which is reliable and longlasting in operation, and which does not interfere with normal utilization of the drill.

Further objects will be in part apparent and in part pointed out hereinbelow.

BRIEF DESCRIPTION OF THE DRAWINGS

FIG. 1 is a side elevational view of a selectively reversible, variable speed electric drill-type tool of commercially available hand-held type equipped with an accessory constructed in accordance with and embodying the present invention for the purpose of facilitating engagement and disengagement of the shank of a drill bit or the like by the chuck of the tool.

FIG. 2 is a front end elevational view of the tool as equipped with an accessory of the invention and illustrating a locking member of the accessory in a first position permitting normal use of the tool.

FIG. 3 is a cross-section taken generally along line 3—3 of FIG. 2 for the purpose of illustrating operation of the accessory with the locking member in a second position.

Corresponding reference characters indicate corresponding parts throughout the view of the drawings.

DESCRIPTION OF THE PREFERRED EMBODIMENT

Referring now to the drawings, there is indicated at reference numeral 1 a hand-held drill-type tool, hereinafter called a drill, which is of a small portable character which is widely commercially available, being merely representative of one of various such types of drills which are on the market. Drill 1 has a housing 3 containing the usual variable speed electric motor, the degree of energization of which is adapted to be controlled by the amount by which a trigger 5 within a pistol-type grip 7 below motor housing 3 is depressed. Also located within the hand grip portion 7 of the tool is a switch 9 permitting selection of the direction of rotation of the drill motor in response to actuation of trigger switch 5. A power cord 11 conventionally supplies AC power (e.g., at 110–120 VAC). However, drill 1 may be operated by a rechargable battery or cell contained within the drill.

At the front of motor housing 3 is a gear housing 13 containing speed reduction gearing (not shown) which reduces the motor speed appropriately whereby a useful shaft output speed is obtained for applying a relatively large torque to a tool, such as a drill bit 15 engaged by a drill chuck 17 (hereinafter referred to as a chuck) extending forwardly from gear housing 13.

Chuck 17 is of an entirely conventional nature, such as the widely commercially available Jacobs type in ubiquitous use. Such chuck has a nose or body 19 which has an axial opening 21 (see FIG. 2) adapted to receive the shank 23 of bit 15 or any other shanked work piece or tool of appropriate diameter, such as the spindle of a polishing or sanding disk. Regardless of the character of the work piece or tool, such as drill bit 15, shank 23 is adapted to be clampingly engaged by a plurality of teeth 25 spaced around the axis 27 of rotation of the chuck, in an entirely conventional fashion.

As is well-known, chucks of this type typically also include a housing or sleeve 29 which is rotatable about axis 27 with respect to nose 19 for the purpose of tightening or loosening of teeth 25 about shank 15. Such relative movement of sleeve 29 with respect to other elements of chuck 17 for tightening or loosening of the chuck about a drill shank or the like is conventionally facilitated by toothed serrations 31 around the forward periphery 33 of sleeve 29. Such serrations 31 in effect constitute gear teeth. For tightening or loosening purposes, a conventional chuck key (not shown) may be inserted in one of a plurality of circular apertures 35 in the nose of the chuck. The chuck key has corresponding gear teeth which mesh with teeth 31 to obtain relative movement of sleeve 29 with respect to nose 19.

Drill 1 is shown provided with an accessory of the invention, designated in its entirety by reference numeral 37. The new accessory comprises a collar 39 of annular form extending forwardly from gear housing 13 and along a substantial portion (see FIG. 3) of the length of chuck sleeve 29. Collar 39 is preferably formed of cast, extruded or drawn tubing such as of iron, steel, aluminum, or a suitable alloy being of right cylindrical form. Said sleeve is secured to the front surface of gear housing 13 in a manner to be described hereinbelow.

Carried by sleeve 29 in a position generally below the chuck (see FIG. 2), and preferably slightly offset from the plane 41 of lateral symmetry of the drill (see FIG. 2) for a purpose to be described, is a cylindrical locking pin 43 of steel, hardened aluminum, or the like. Said pin 43 is fitted within a bore 45 of collar 39. Preferably the collar is provided with a boss 47 extending outwardly from the collar concentric with bore 45 and secured to the collar as by welding. Alternatively, the boss is integrally formed with collar 39 by being precast with it.

For the purpose of utilizing the accessory, chuck sleeve 29 is provided with at least one aperture 49 of diameter slightly larger than pin 43 for receiving a tapered nose 51 of the pin. As will be apparent, pin 43 is slidable axially within bore 45 of the collar for movement from a first position, as shown in FIG. 2, permitting unencumbered rotation of chuck 17 in normal operation, to a second position wherein nose 51 of the pin is received within aperture 49, as shown in FIG. 3.

For this purpose, the pin is adapted to be shifted by pressing on a domed head or button 53 carried at the outer end of the shank of pin 43. A coiled compression spring 55 fitted around the pin bears against the inner side of button 53 and against a shoulder 57 of boss 47 for the purpose of resiliently biasing pin 43 to its position shown in FIG. 2. The pin is retained within bore 45 by means of a small stud 59 adjacent the nose of the pin. As shown in FIG. 3, stud 59 is adapted to engage the outer peripheral surface of chuck sleeve 29 when the pin is shifted by pressure against button 53 to prevent the nose 53 of the pin from extending too far into aperture 49 of the sleeve. Preferably, also, boss 47 is partly cut away to provide an area 61 of relief for movement of stud 59 to a position wherein the nose 53 of the pin is well clear of the outer peripheral surface of chuck sleeve 29.

Collar 39 of the new accessory is affixed to the front surface of gear housing 13 preferably by being bolted thereto although it is contemplated that gear housing 13 may be cast to provide, as an integral extension portion thereof, said collar 39. However, many commercially available drills are constructed like drill 1 wherein the piston grip housing 7, drill motor housing 3, and gear housing 13 are maintained in secured relationship by screws or bolts, such as that illustrated in FIG. 1 at reference numeral 63 which extend lengthwise through each of these several housing elements.

Therefore, simple design change of easily facilitated modification of the drill is a simple matter to provide for the extension of the bore through which such bolts (such as that indicated at 63) may pass, so that an elongated bolt shank as indicated at 63' may extend forwardly from gear housing 13 as illustrated. Preferably then, collar 39 is provided with a pair of flanges 65, on opposite sides thereof, which include respective apertures 67 (see FIG. 1) through which bolt shanks 63' pass and are fastened, as indicated at 67, by means of double lock nuts, etc., as illustrated. Flanges 65 may each be integrally cast with collar 39 or may instead be welded to the collar but, in any event, are of sufficient strength to permit normal tightening of bolts as illustrated at 63 for maintaining the structural integrity of the drill housing elements.

Preferably, as noted, there is a slight angular offsetting, i.e., about 25° as shown, of pin 43 from the plane of lateral symmetry 41 of the tool. Such is not a matter of simple happenstance but serves a most desirable function, permitting the depressing of button 53 by pinch action of the user upon tactile engagement of button 53 and a portion 69 of collar 53 diametrically opposed from the axis of pin 43, wherein the fingers of the user, as illustrated by the thumb 71 and forefinger 73, are presented in physiological natural grasping orientation when drill 1 is held in the opposite hand of the user, permitting natural pinching action with one hand while simultaneous squeezing the hand grip 7 and trigger 6 with the other hand. The diametrically opposed pinching forces are illustrated in FIG. 3 by arrows.

In operation it is, therefore, a matter of great convenience and rapid speed to depress button 53 in the manner just described until only nose 51 but not the shank of the pin moves into the circular excess or aperture 49 of the chuck. For this purpose it may be necessary to operate trigger switch 45 slightly to cause rotation of the chuck through a sufficient angular extent to bring the aperture into alignment with pin 43. When this is done, chuck sleeve 29 is locked to prevent rotation thereof relative to gear housing 13.

Accordingly, further energization of the drill motor by depressing trigger switch 5 will cause rotation of the nose 19 and other elements of the chuck relative to housing 13. Typically, if clockwise, this will cause tightening of teeth 25 for clamping engagement of shank 15. It may be here noted that if excessive torque were to be applied to the chuck by utilizing the trigger switch for excessive energization of the drill motor, a camming force would be exerted by the periphery of aperture 49 upon the beveled or tapered surface of nose 51 of the pin, causing the pin to be moved outwardly to permit rotation of the chuck without damage to the drill. Upon proper tightening of the chuck, button 53 is released.

The clampingly engaged drill bit 15 may now be utilized in a normal manner. Chuck sleeve 29 is then to rotate without interference from accessory 37 as if the latter were not even present.

For disengagement of shank 23, reversing switch is moved to its other position whereby the chuck will be caused to operate in the reverse, or counterclockwise direction, upon depressing trigger switch 5. The user may then again depress button 53 to move the nose of locking pin 43 into chuck sleeve aperture 49 in the previously described manner. Again, the sleeve is prevented from rotating relative to housing 13 whereupon operation of trigger switch 5 will cause rotation of chuck nose 19 and other elements relative to sleeve 29 for loosening of teeth 25 about shank 23 for disengagement of the drill bit or other tool, etc.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What I claim and desire to secure by Letters Patent is:

1. An accessory for use with a drill-type tool having a housing and a chuck extending outwardly from said housing for facilitating chuck engagement and disengagement of a drill bit shank or the like, said chuck being rotatingly drivable in selectively reversible directions by said tool and having a sleeve including a recess therein, said sleeve being rotatable axially about said chuck for tightening and loosening of said chuck, said accessory comprising a collar having flanges on opposite sides, said flanges having apertures for receiving means structurally retaining said housing upon said tool for securing said collar to said housing in chuck-surrounding relationship, said collar carrying a locking pin carrying a manipulating button, said pin being in chuck confronting orientation in alignment with said chuck sleeve recess for radial shifting movement toward and away from said chuck sleeve recess perpendicular to the axis of rotation of said chuck, said collar having a bore, said pin being set within said bore, a spring interengaging said collar and said button for resiliently biasing said pin radially outward from said chuck toward a first position disengaged from said chuck, means for retaining said pin in said bore of said collar, said button being carried by said pin and manipulatively engageable for shifting said pin radially inwardly toward said chuck toward a second position of engagement with said chuck sleeve recess for locking said sleeve relative to said collar to prevent rotation of said sleeve with respect to said housing, said pin extending radially outwardly from said collar in downward angular offset relationship to said housing wherein said pin has a longitudinal axis along which said pin is radially shiftable, said tool having a handle including a squeezable trigger switch extending downwardly from said housing, said plane of lateral symmetry transecting said handle, the longitudinal axis of said pin forming an angle with said plane of lateral symmetry, and thereby with said handle, of about 25°, for presenting said button for manipulative engagement and radially inward shifting by pinching action of one hand of the user upon tactile interengagement of said button and collar by the user's fingers in opposed relationship while the other hand of the user grasps said handle, whereby said pinching action is carried out by the user while simultaneously grasping said handle and squeezing said trigger, physiologically natural grasping orientation of the user's hands and fingers, operation of said tool upon simultaneous pinching action and squeezing of said trigger switch providing rotation of said chuck in one direction or the reversed direction for respective tightening or loosening of said chuck.

2. An accessory as defined in claim 1, said drill trigger switch being selectively squeezable for selectively varying the speed of operation of said drill for controlling the degree of energization of an electric motor therein driving said chuck, said degree of energization if too great causing excessive torque to be applied to said chuck when said pin is in said second position, said pin having a shank having at its outer end a nose receivable by said chuck recess, said chuck recess being constituted by a circular aperture, said nose having a tapered edge and said pin being configured so that with movement to said second position only said tapered edge but not said shank engaging the periphery of said aperture, said tapered edge normally preventing rotation of said chuck relative to said sleeve but permitting the periphery of said aperture to create upon said pin a force radially outward from said chuck for tending to cause movement of said pin to said first position in response to excessive torque applied to said chuck by said motor.

* * * * *